United States Patent [19]

Caveney et al.

[11] Patent Number: 5,672,033
[45] Date of Patent: Sep. 30, 1997

[54] LATCHING DUCT COVER FIXTURE

[75] Inventors: Jack E. Caveney, Hinsdale; Robert Nicoli, Glenwood, both of Ill.

[73] Assignee: Panduit Corp., Tinley Park, Ill.

[21] Appl. No.: 532,188

[22] Filed: Sep. 22, 1995

[51] Int. Cl.⁶ ................................................ B23B 49/02
[52] U.S. Cl. .................... 408/72 B; 174/68.3; 174/101; 220/335
[58] Field of Search ................. 408/72 R, 72 B, 408/115 R, 115 B; 174/48, 68.1, 68.3, 99 R, 101; 220/335; 16/319

[56] References Cited

U.S. PATENT DOCUMENTS

| 4,406,379 | 9/1983 | Anderson et al. | 220/335 |
| 4,492,420 | 1/1985 | Stuart | 408/115 R |
| 4,694,533 | 9/1987 | Doyen | 16/356 |
| 5,235,136 | 8/1993 | Santucci et al. | 174/68.3 |

*Primary Examiner*—Steven C. Bishop
*Attorney, Agent, or Firm*—Mark D. Hilliard; Robert A. McCann

[57] ABSTRACT

A fixture for engagement with a duct or raceway of the type having a base and an integral cover, wherein the fixture includes a pair of arms for maintaining the cover in the open position. The fixture includes pilot guide holes for locating drilling positions for mounting the duct to a wall.

19 Claims, 3 Drawing Sheets

LATCHING DUCT COVER FIXTURE

TECHNICAL FIELD

The present invention relates to a fixture for use with a duct having a floor, sidewalls, and an integral cover flexibly attached to a sidewall for maintaining the duct cover in an open position, and more particularly to a fixture having a base and a pair of projecting arms for engagement with the duct and cover and including a plurality of alignment holes for locating drilling positions and allowing the duct to be more easily mounted to the wall.

BACKGROUND OF THE INVENTION

In the electrical industry there are a wide variety of ducts and raceways used for applications in which bundles of wires or cables are routed along panels or other mounting surfaces. Many of these ducts are of the type which include an integral cover hingedly connected to the base. One type of this duct is known in the industry as latching duct. Latching duct is frequently mounted on a wall or a panel by drilling holes in the duct floor and securing by screws. It is difficult, however, for a single user to handle the drill and/or screwdriver necessary to mount the latching duct because the user also needs to pull the cover back and hold it in the open position to allow access to the floor of the duct.

SUMMARY OF THE INVENTION

It is therefore an object of the present invention to provide a fixture for supporting an integral duct cover in the open position.

It is a further object of the invention to provide a fixture for supporting an integral duct cover in the open position that includes pilot holes for allowing drilling of the mounting holes in the duct floor.

It is still further an object of the present invention to provide a fixture for supporting an integral duct cover in the open position that is slidably engaged with the duct.

In general, a fixture for supporting the cover of a duct having a floor and an integral cover in the open position includes a base for positioning on the floor of the duct and cover retaining means projecting from the base for maintaining the cover in an open position. The fixture also generally includes pilot holes formed in the base for locating positions and providing access for a user to drill holes in the floor of the duct.

DESCRIPTION OF THE PREFERRED EMBODIMENT

Figure 1:
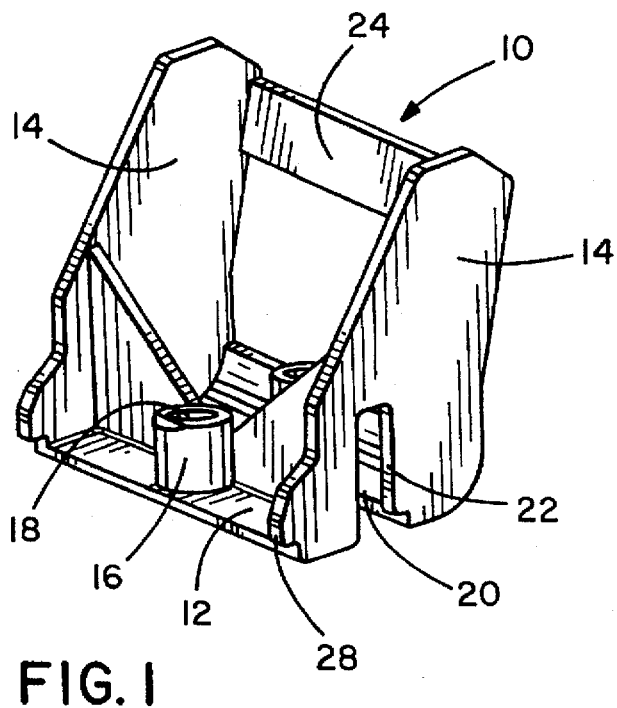
FIG. 1 is a perspective view of a fixture for supporting an integral duct cover in the open position of the present invention.
Figure 3:
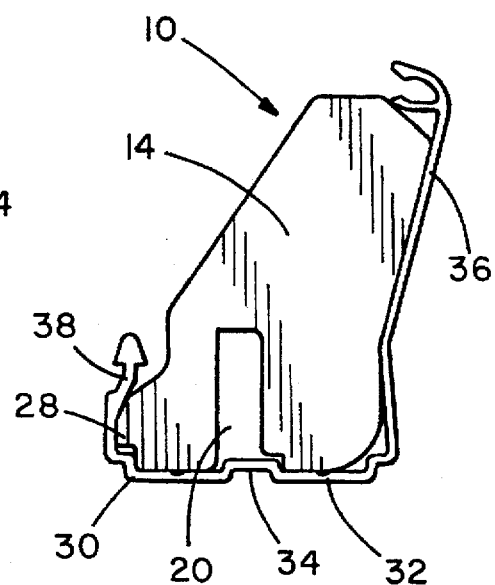
FIG. 3 is a side view of the fixture of FIG. 1 shown supporting an integral duct cover in the open position.
Figure 2:
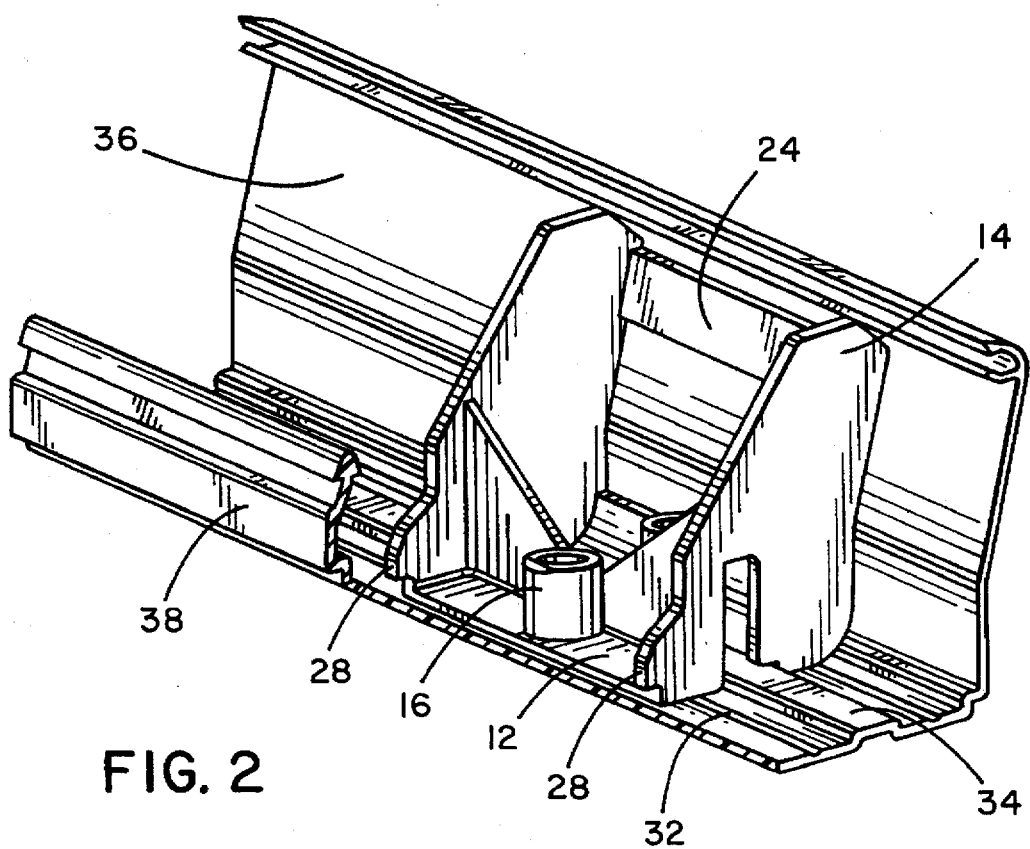
FIG. 2 is a perspective view of a fixture of FIG. 1 shown supporting an integral duct cover in the open position.
Figure 4:
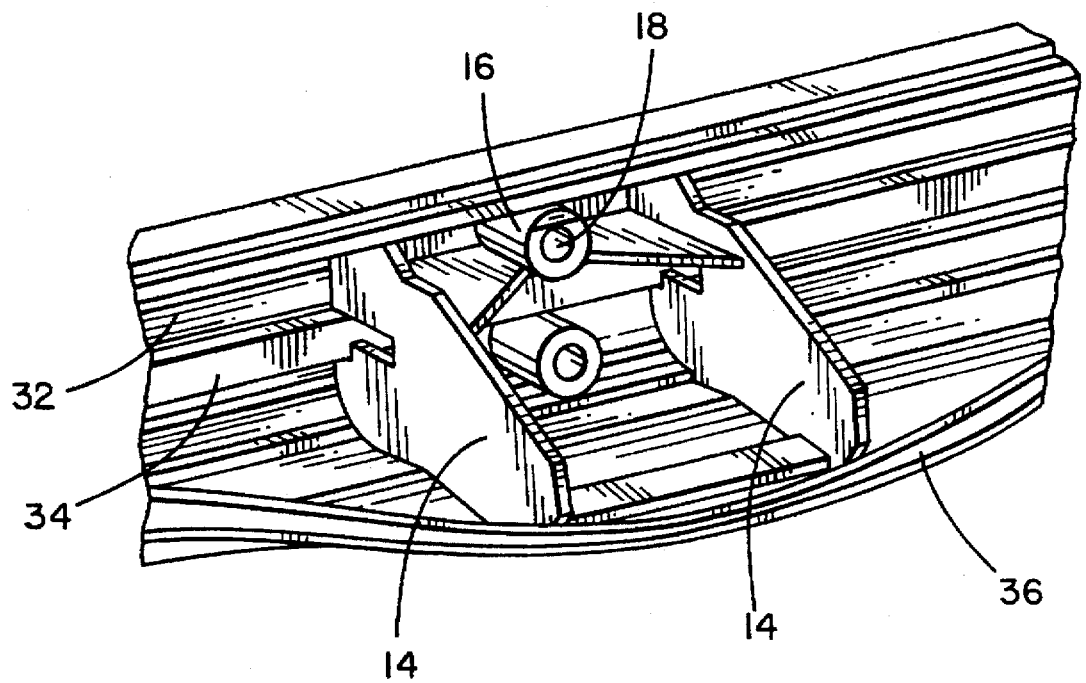
FIG. 4 is an isometric view of the fixture of FIG. 1 shown supporting an integral duct cover in the open position.
Figure 5:
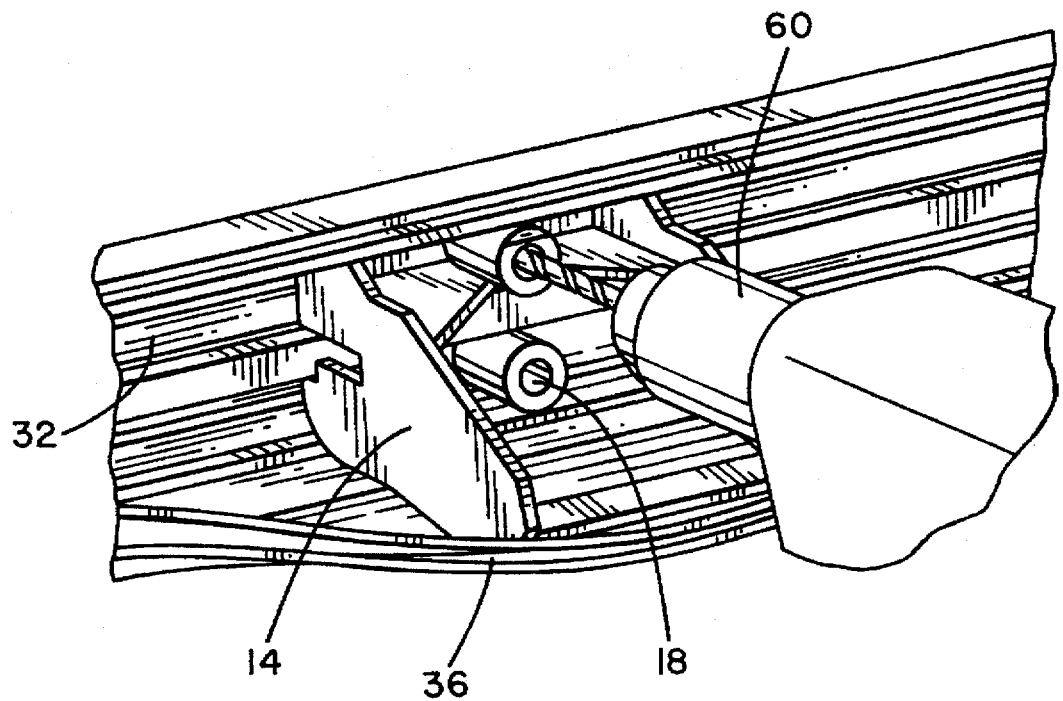
FIG. 5 is an isometric view of the fixture of FIG. 1 shown supporting an integral duct cover in the open position.

A fixture embodying the concept of the present invention is designated generally by the reference numeral 10 in the accompanying drawings. Fixture 10 includes a base 12 and a pair of arms 14 projecting upwardly from the base 12. As can be seen in FIGS. 2 and 3, the lower ends of arms 14 adjacent base 12 include duct engaging lips 28 and the length of the arms 14 is sufficient so as to maintain the cover 36 in the open position when fixture 10 is secured within duct 30. The base 12 of fixture 10 also includes a pair of pilot holes 18 including vertically oriented cylindrical columns 16. These provide access to the floor 32 and position the user for drilling holes in floor 32 for mounting purposes. Fixture 10 is further provided with strengthening ribs 24 disposed between the pair of arms 14.

As best shown in FIGS. 2–5, fixture 10 is placed inside the latching duct 30 such that the duct engaging lip 28 helps to secure fixture 10 within duct 30 by creating a press fit between sidewalls 38. Fixture arms 14 are disposed so as to support the duct cover 36 in an open position. The tension of the duct cover 36 wanting to return to its closed position also helps hold fixture 10 in place. As best seen in FIG. 3, fixture arms 14 are shaped with an angled portion that extends beyond the plane of sidewall 38 so as to be able to hold cover 36 open beyond the 90° position, thus making it easier for the installer to use a drill 60 to make the duct mounting holes without being required to hold cover 36 open by hand. Pilot holes 18 are centrally located along the base 12 of fixture 10 and to provide access for the installer to drill the mounting holes through the duct floor 32 as desired. Cylindrical pilot guide columns 16 extend above pilot holes 18 so as to guide a drill bit of the user through pilot holes 18. It is noted that the duct shown in FIGS. 2, 4 and 5 has a centrally disposed longitudinally extending raised floor section 34, which allows for the duct 30 to be mated with tabs formed on accessory items such as fitting bases (not shown). Therefore, base opening 20 has been formed in base 12 to accommodate the raised floor section 34 by fixture 10. A pilot hole 18 and pilot guide 16 are formed on base 12 on each side of base opening 20. After the mounting holes have been drilled through duct floor 32, fixture 10 can be slid to either side of the drilled mounting holes, thus continuing to maintain duct cover 36 in the open position while allowing the installer to fasten the duct 30 by mounting screws. The user can either drill mounting holes through the floor at both pilot holes 18 or they can alternate holes as the fixture 10 is slid longitudinally along duct 30.

Figure 6:
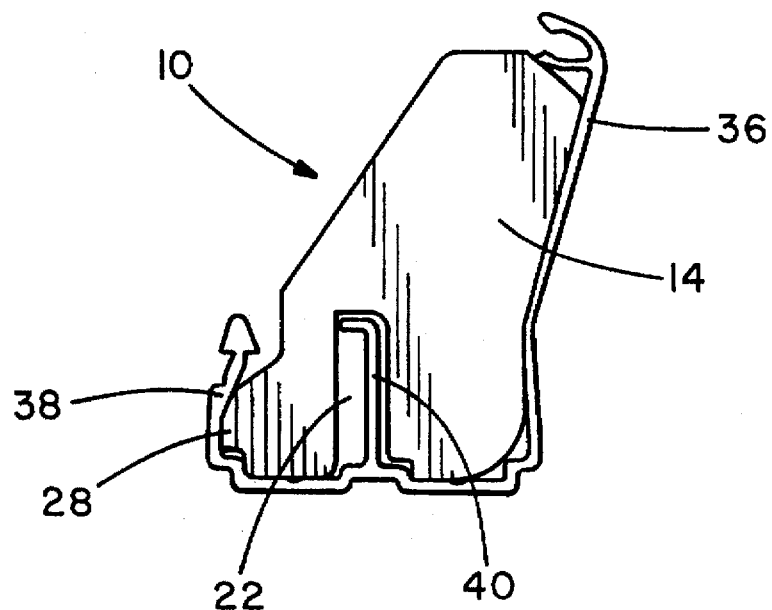
FIG. 6 is a side view of the fixture of FIG. 1 shown supporting an integral duct cover in the open position for a divided channel type duct.

FIG. 6 shows the fixture 10 of the present invention shown attached to a divided wall duct 40 which includes a divider wall separating the duct into two separate channels. As can be seen in FIG. 6, fixture 10 includes a divider slot 22 formed in each arm 14 to allow fixture 10 to be secured to duct 40 for this type of raceway.

Figure 7:
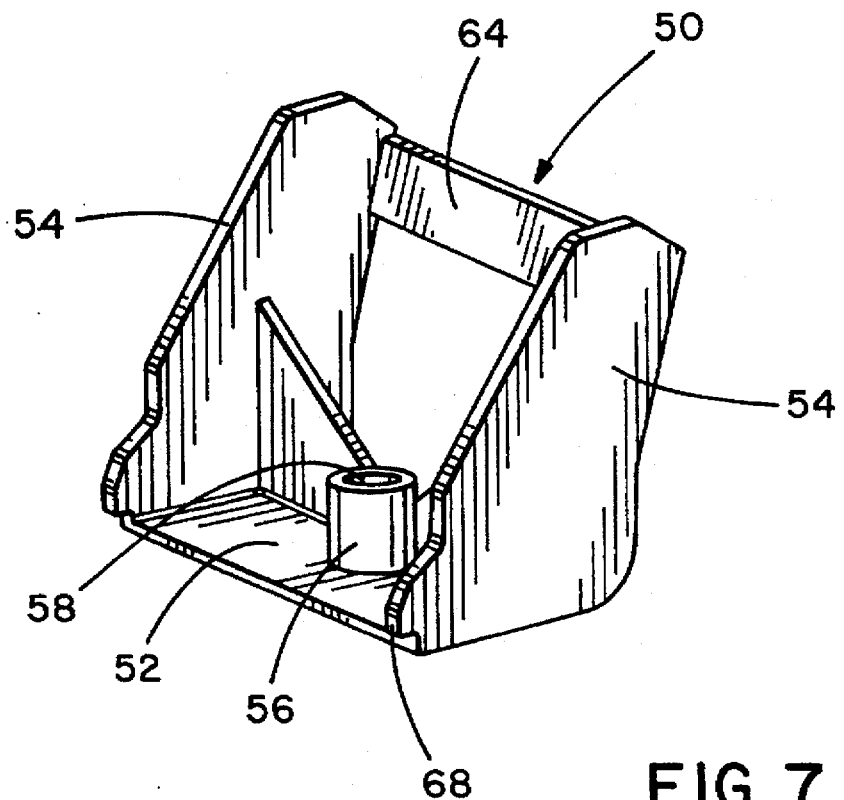
FIG. 7 is a perspective view of another embodiment of a fixture for supporting an integral duct cover in the open position.

FIG. 7 shows another embodiment of a fixture of the present invention. The fixture 50 of FIG. 7 has a base 52 that does not include the divider groove 20 or divider slot 22 of fixture 10. Fixture 50, therefore, could be used with ducts of the type that have a flat floor section. A pair of arms 54 project upwardly from base 52 and include duct engaging lips 68 so as to help secure fixture 50 within the duct by a press fit. Fixture 50 also includes strengthening ribs 64 disposed between the pair of arms 54. Fixture 50 of FIG. 7 also shows a single pilot hole 58 and pilot guide 56. Due to the flat duct floor on which this fixture 50 would be used, the pilot hole 58 and accompanying pilot guide 56 can be centrally located along the base 52.

It is to be noted that while the embodiments have been shown in use with a particular style latching duct, a fixture of the present invention could be modified as to shape and dimensions to accommodate various other styles of latching duct.

While the particular embodiments of the present invention have been shown and described, it will be obvious to those skilled in the art that changes and modifications may be made without departing from the invention in its broader aspects. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A fixture for positioning in a duct having a floor and a cover movable from an open position of approximately ninety degrees from the floor to a closed position, comprising;

a base for positioning on the floor of the duct; and cover retaining means projecting from the base for maintaining the cover in the open position, and wherein the base includes alignment means for locating positions on the duct floor.

2. A fixture according to claim 1, wherein the alignment means is a plurality of pilot holes extending through the base.

3. A fixture according to claim 2, wherein there are two pilot holes.

4. A fixture according to claim 1, wherein the alignment means is one pilot hole extending through the base.

5. A fixture according to claim 2, wherein the base includes vertically extending cylindrical columns surrounding the pilot holes.

6. A fixture according to claim 1, wherein the cover retaining means includes a cover retaining arm disposed on the base.

7. A fixture according to claim 6, wherein the cover retaining means includes a pair of cover retaining arms disposed on the lateral edges of the base.

8. A fixture according to claim 7, including a supporting rib disposed between the pair of arms.

9. A fixture according to claim 6, wherein the arm includes an angled portion disposed so that the cover is held in an open position at an angle greater than ninety degrees from the floor.

10. A fixture according to claim 6, wherein the arm includes a lip formed adjacent the base for engaging a sidewall of the duct.

11. A fixture according to claim 1, for use with a duct having a longitudinally extending raised floor section, wherein the base includes an open section disposed for accommodating the raised floor section of the duct.

12. A fixture according to claim 11, wherein the open section of the base is centrally disposed.

13. A fixture according to claim 11, wherein the cover retaining means includes a pair of arms disposed on the base.

14. A fixture according to claim 1, for use with a duct having a longitudinally extending divider wall projecting from the floor, wherein the base and the cover retaining means includes a divider slot for accommodating the divider wall of the duct.

15. A fixture according to claim 14, wherein the divider slot is centrally disposed.

16. A fixture according to claim 14, wherein the cover retaining means includes a pair of arms disposed on the base.

17. A fixture according to claim 1, wherein the fixture is slidably engaged within the duct.

18. A fixture according to claim 1, wherein the cover is integrally formed to a sidewall of the duct.

19. A fixture for positioning in a duct having a floor and a first and second sidewall, wherein a cover is hingedly connected to the second sidewall and movable from an open to a closed position, comprising:

a base for positioning on the floor of the duct having a pair of arms projecting to a sufficient height so as to hold the cover in an open position of at least ninety degrees;

an opening formed in the base for accommodating ducts of the type that include a raised floor section;

a slot formed in the arms for accommodating ducts of the type that include a divider wall extending from the floor; and a pair of pilot holes formed in the base and including vertically oriented cylindrical column guides around the holes.

* * * * *